Patented Jan. 9, 1934

1,942,943

UNITED STATES PATENT OFFICE 1,942,943

FEED

Charles F. Schnabel, Kansas City, Kans.

No Drawing. Application April 15, 1933
Serial No. 666,324

2 Claims. (Cl. 99—11)

This invention relates to feeds, and with regard to certain more specific features, to feeds for animal or human consumption, which have a general health improving, nutritive action.

Among the several objects of the invention may be noted the provision of feeds of the class described which supply essential elements in extraordinarily enhanced quantity, and which supply particularly such food elements as give rise to an enhanced fertility or productivity, particularly when fed to domestic livestock animals, including poultry; the provision of feeds of the class described which are readily obtained, and which retain their activity throughout the necessary storage periods; and the provision of feeds of the class described which are economical of production and use, and which substitute, with improved effect, larger quantities of more costly feeds. Other objects will be in part obvious and in part pointed out hereinafter.

The invention accordingly comprises the elements and combinations of elements, and features of composition, which will be exemplified in the products hereinafter described, and the scope of the application of which will be indicated in the following claims.

Nutritional science has substantially established the hypothesis that, for the continuance of animal life, certain essentials must be present in the nutriment. These essentials are variously identified as vitamins, hormones, enzymes, growth catalyzers, and the like, some of which are supposed to be generated within the body of the animal and others of which are supposed to be supplied with the nutriment. As to the positive identification of these essentials, little satisfactory work has been done, principally because, at least in some instances, it is extremely doubtful whether the essential is a substance in the ordinary sense of the word. Vitamins, for example, may well be "conditions" and not substances, and may ultimately be proved to be similar phenomena to the conditions of temperature, pressure, and the like which are known to be required to support animal life.

Regardless of the precise nature of these essentials, it has been shown with relative certainty that the absence thereof is most quickly reflected in the composition of the blood of the animal. It is well known that if the pH value of the blood of a human being, for example, varies through limits wider than those existing between ordinary tap water and distilled water, life is impossible. Within the blood, it appears that the substance hemoglobin is the most essential ingredient for the continuance of life, health, and reproductive function. It has been shown, even, that the hemoglobin content of the blood remains substantially level even over a prolonged period of fasting; this appears to be the result of automatic tendencies on the part of the body to maintain the hemoglobin content at a level even at the expense of other body substances.

There is a clear connection between the hemoglobin productivity of an animal and its reproductive faculty. The processes of reproduction require that the maternal animal supply not only its own hemoglobin at a constant rate, but also that additional hemoglobin be supplied for the young. It may well be that the nutritional essential termed vitamin E, the reproductive vitamin, is closely allied with this ability to increase the hemoglobin production; the absence of vitamin E, then, meaning a lack of the ability to supply the necessary additional hemoglobin and a consequent diminishing or loss of the reproductive faculty. My observations upon laying hens have tended to confirm this supposition, in that such laying hens have been found to require, for maximum egg productivity, an enhanced ability to create blood hemoglobin, and such hens have a consequent increased demand for nutrition in the form of substances capable of being converted into hemoglobin. This led me to seek a nutrition substance which was most readily assimilable to form hemoglobin.

The precise chemical composition of hemoglobin has not been determined, but several substances identifiable generally as amino-acids have been located. One of these substances is called porphyrin; another, histidine; another, hemin.

There is one plant substance, namely, chlorophyll, which appears to have a composition quite similar to that of these blood constituents. For example, aetophyllin, a degradation product of chlorophyll, has substantially the same composition as the hemin mentioned, with the exception that the nucleus of the ætophyllin has an atom of magnesium, while the hemin contains iron in place of the magnesium. The similarities between hemoglobin and chlorophyll are so marked, from the chemical standpoint, that I was led to investigate the possibilities of high-chlorophyll containing plants as nutriment for the purpose of hemoglobin building, as described.

Substantially all plants contain chlorophyll, just as substantially all animals contain blood. And, just as in the case of blood, I have determined that all forms of chlorophyll are not the same, even though they are not chemically identifiably different. The analogy is with the so-called blood types considered in connection with human blood transfusions; there, no chemical difference is notable between the several types, but the biological differences are most marked.

Not only does the biological composition of the chlorophyll vary with its plant-source, but also, since it is a somewhat transitory substance, with the stage of growth of the particular plant.

My experiments with chlorophyll from multitudinous sources eventually led to the conclusion that the chlorophyll from succulent young green grasses, grown in the sun with plenty of water and preferably in very rich soil, and cut at a very immature stage of growth, when fed as a foodstuff, produce phenomenal results in general health and in the reproductive faculty in particular.

By grasses, I mean to include all plants botanically classified as grasses, including, for example, oats, wheat, barley, Sudan grass, and the like. At a stage of growth such that these grasses have not yet jointed, but are about to do so, their chlorophyll content is highest and most suitable for my feeding purposes. With oats, for example, grown under average conditions, this stage is achieved in from eighteen to twenty-one days after planting, although this period may be longer if weather conditions are not favorable. At such a stage, I cut the immature plants, preferably as closely to the ground as possible. So far as I am aware, such grasses have never before been harvested at such an immature stage in their growth.

The cut grasses are then chopped, in the manner of making silage, and are ready for feeding in their fresh condition; or, when it is desired to store the feed, it is dried in such manner that its chlorophyll content is not impaired. Such drying, for example, may comprise spreading the ensilaged grass on a concrete pavement in the sun, care being taken that it is not rained upon during the drying. Rain during drying, I have found, exerts a harmful effect upon the nutritional qualities of the feed. As an alternative to sun drying, it is possible to dry the ensilaged grasses by passing them on a belt conveyor through a hot air or humidity dryer, or through a rotary drum or like dryer, although, again, it is essential that the water vapors formed during drying be conducted away from the mass of grass as quickly as possible.

The plants from which the immature grasses are cut will, if properly tended, produce another crop which is scarcely discernible from the original crop from the nutritional standpoint, in substantially the same length of time, assuming like weather conditions. Thus, throughout a growing season, periodic cuttings of immature grass may be made from a single sowing.

At the present time, my chief successes with feeds of the class described have been in connection with poultry, more specifically, chicken farming. For such purposes, I have found that a ration made up of about ten to thirty per cent. or more of feed of the general type disclosed above, and the remainder ordinary commercial poultry feed (grains, etc.) produces extraordinary results, as stated hereinafter. The grass feed portion of the above ration most advantageously comprises the following:

80 to 90% ground dried greens (comprising about 60% oats, 30% wheat, and 10% barley)
0 to 10% mustard greens (50%) and turnip tops (50%)
0 to 10% Swiss chard or New Zealand spinach.

The mustard greens, turnip tops, Swiss chard, and New Zealand spinach serve chiefly for their condimental values, although these plants, when cut green, likewise have a high chlorophyll content (but not as high or of the same nutritional qualities as the green grasses.)

The results with such feeding of a flock of 100 experimental hens showed an increase in the number of eggs laid that was little short of phenomenal. Considering one egg per hen per day as 100% production, the production of this flock over a trial period including the months of April, May, June, July, August, and part of September, averaged about 98%, with some days running well over 100%. After mid-September, the production dropped somewhat, but it was still notably above the usual production level for that time of the year. These tests have since been repeated, with equal success. During the test period, the commercial feed and grain consumption of the flock was about 450 pounds per month, which compared with about 800 pounds per month before the flock was put on the greens feed ration, with a much smaller productivity. During the test, the consumption of greens (referring to the undried greens) was about 600 pounds per month. Thus, the use of the feed of the present invention is not only attended by a considerable increase in productivity, but by a reduction in cost of the feed material (since the greens feed of the present invention is considerably less costly than the commercial feeds and grains which it replaces). The condition of the hens throughout the test was of the best; there appeared to be none of the diseased conditions ordinarily associated with highly forced laying, and not one case of cannibalism was found. The general health level of the hens was higher, to my observation, than any comparable flock I have ever noted.

A series of comparable tests were made feeding a greens ration, properly proportioned, to a milk cow. The milk production increased 50% or more over the production prior to the greens ration.

From the above, it will be seen that the invention comprises, primarily, preparing a feed which contains an abundance of chlorophyll of the type found in immature grasses at such a stage in their growth that they have not yet jointed, but are about to do so. The several specific aspects of the invention, relating to the particular grasses and mixtures thereof, have likewise been set forth.

In view of the above, it will be seen that the several objects of the invention are achieved and other advantageous results attained.

As many changes could be made in carrying out the above compositions without departing from the scope of the invention, it is intended that all matter contained in the above description shall be interpreted as illustrative and not in a limiting sense.

I claim:

1. A feed comprising immature grasses grown in rich soil, in the sun, and cut at a stage of growth where jointing has not yet occurred, but is about to do so, and dried in such a manner as to retain substantially uninjured the original chlorophyll content of the grasses.

2. A feed comprising a mixture of chopped oats, wheat, and barley leaves grown in rich soil and in the sun, said leaves having been cut from their respective plants at such a stage of growth that the plants have not yet jointed, but are about to do so, said cut leaves being dried in such manner as to retain substantially uninjured the original chlorophyll constituents thereof.

CHARLES F. SCHNABEL.